No. 868,290. PATENTED OCT. 15, 1907.
B. H. PAUL.
MACHINE FOR SEEDING RAISINS AND OTHER FRUITS.
APPLICATION FILED JAN. 3, 1907.
5 SHEETS—SHEET 1.
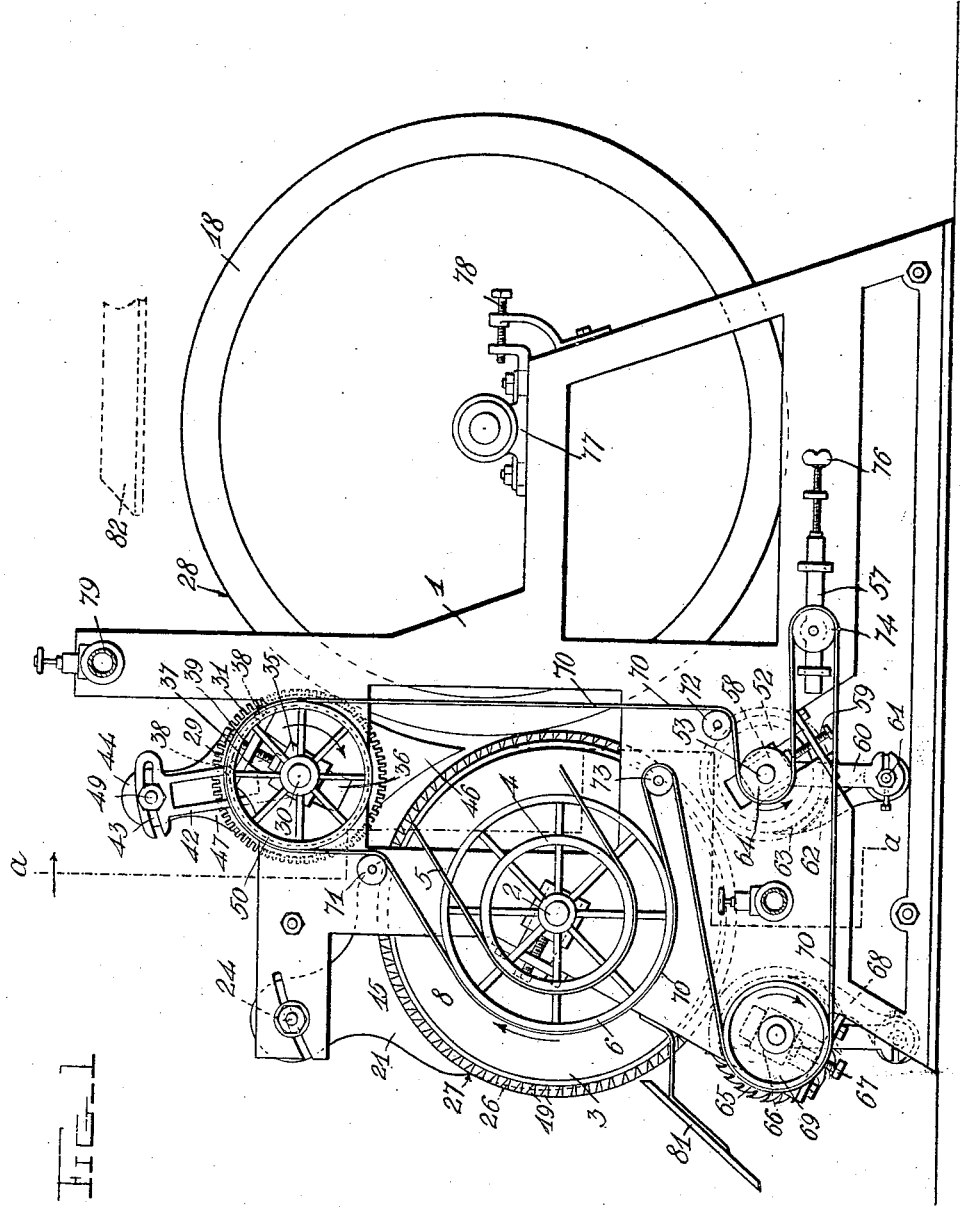
Witnesses
C. H. Griesbauer.
Inventor
Basil H. Paul
by H. B. Willson & Co.
Attorneys No. 868,290. PATENTED OCT. 15, 1907.
B. H. PAUL.
MACHINE FOR SEEDING RAISINS AND OTHER FRUITS.
APPLICATION FILED JAN. 3, 1907.
5 SHEETS—SHEET 2.
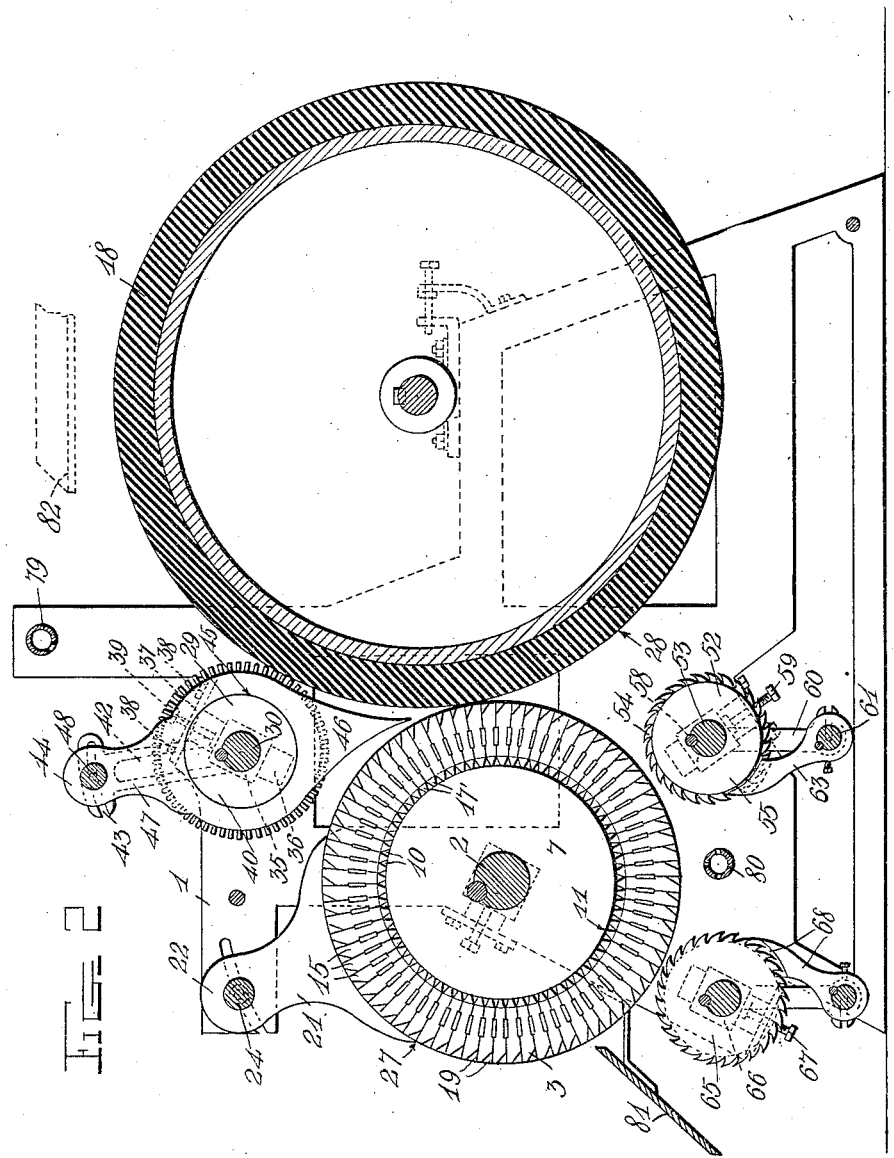
Witnesses
Inventor
Basil H. Paul
by H. B. Willson & Co
Attorneys

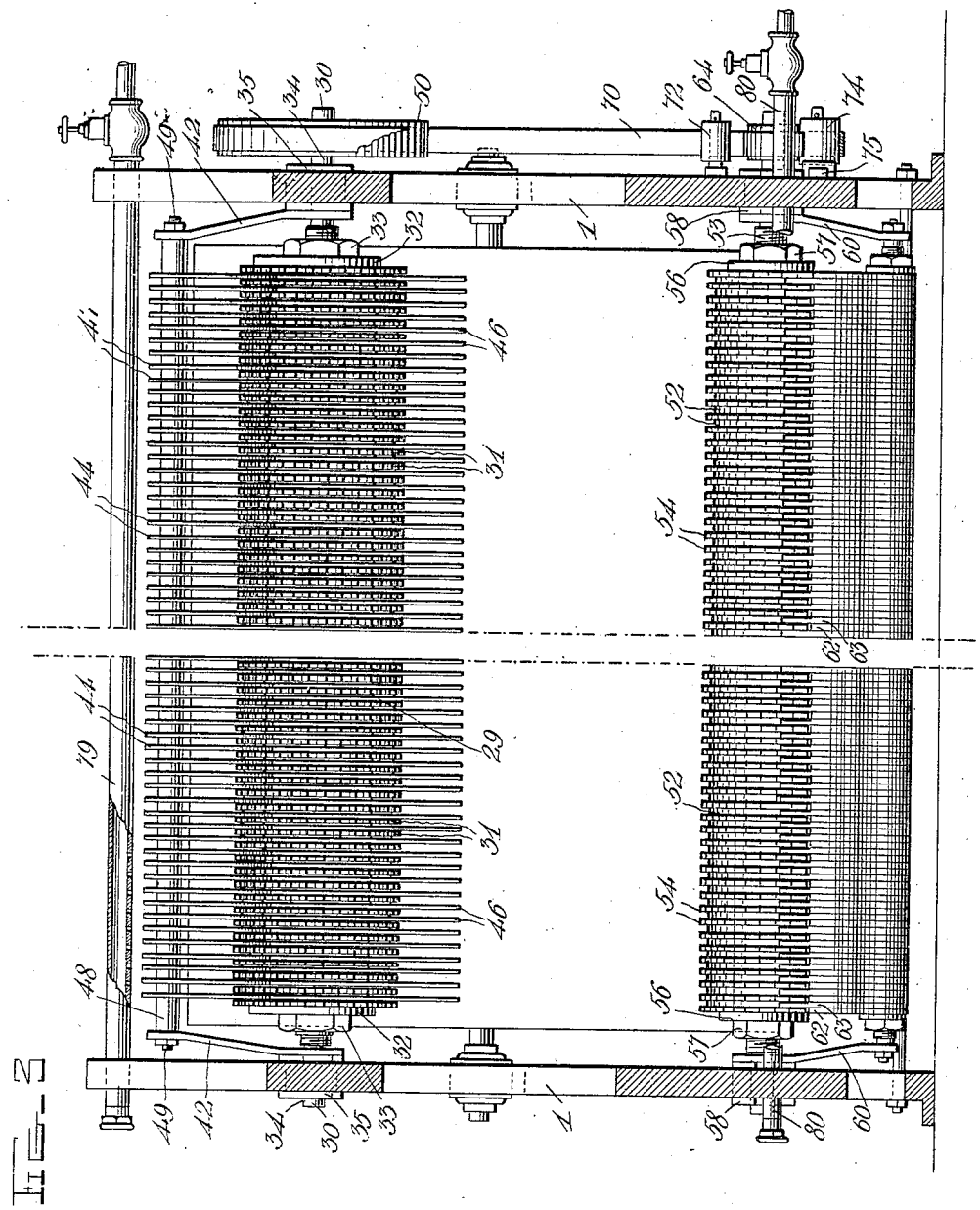

No. 868,290. PATENTED OCT. 15, 1907.
B. H. PAUL.
MACHINE FOR SEEDING RAISINS AND OTHER FRUITS.
APPLICATION FILED JAN. 3, 1907.
5 SHEETS—SHEET 4.
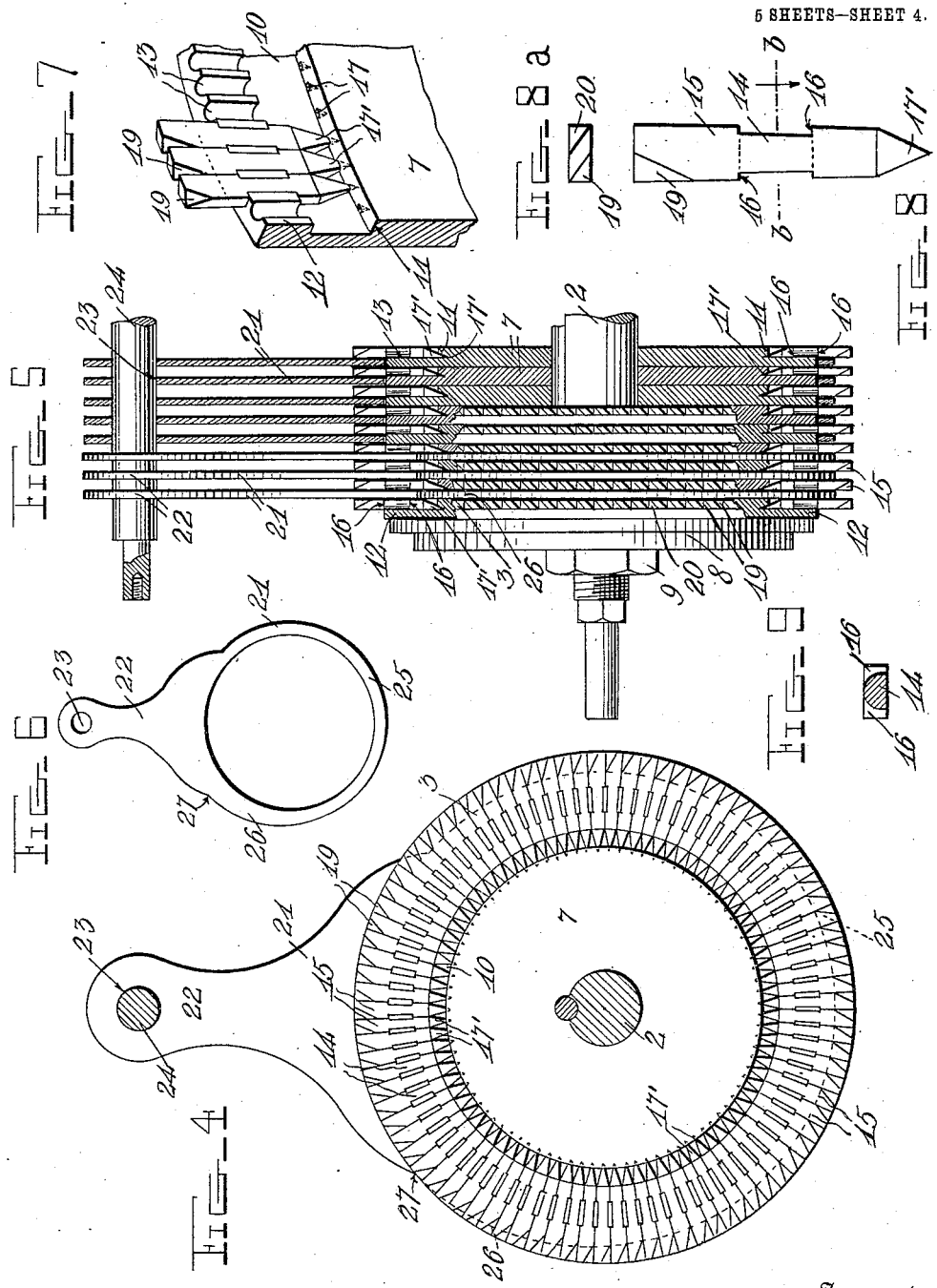
Witnesses
C. Munker
C. H. Griesbauer
Inventor
Basil H. Paul
by H. B. Willson & Co.
Attorneys No. 868,290. PATENTED OCT. 15, 1907.
B. H. PAUL.
MACHINE FOR SEEDING RAISINS AND OTHER FRUITS.
APPLICATION FILED JAN. 3, 1907.
5 SHEETS—SHEET 5.
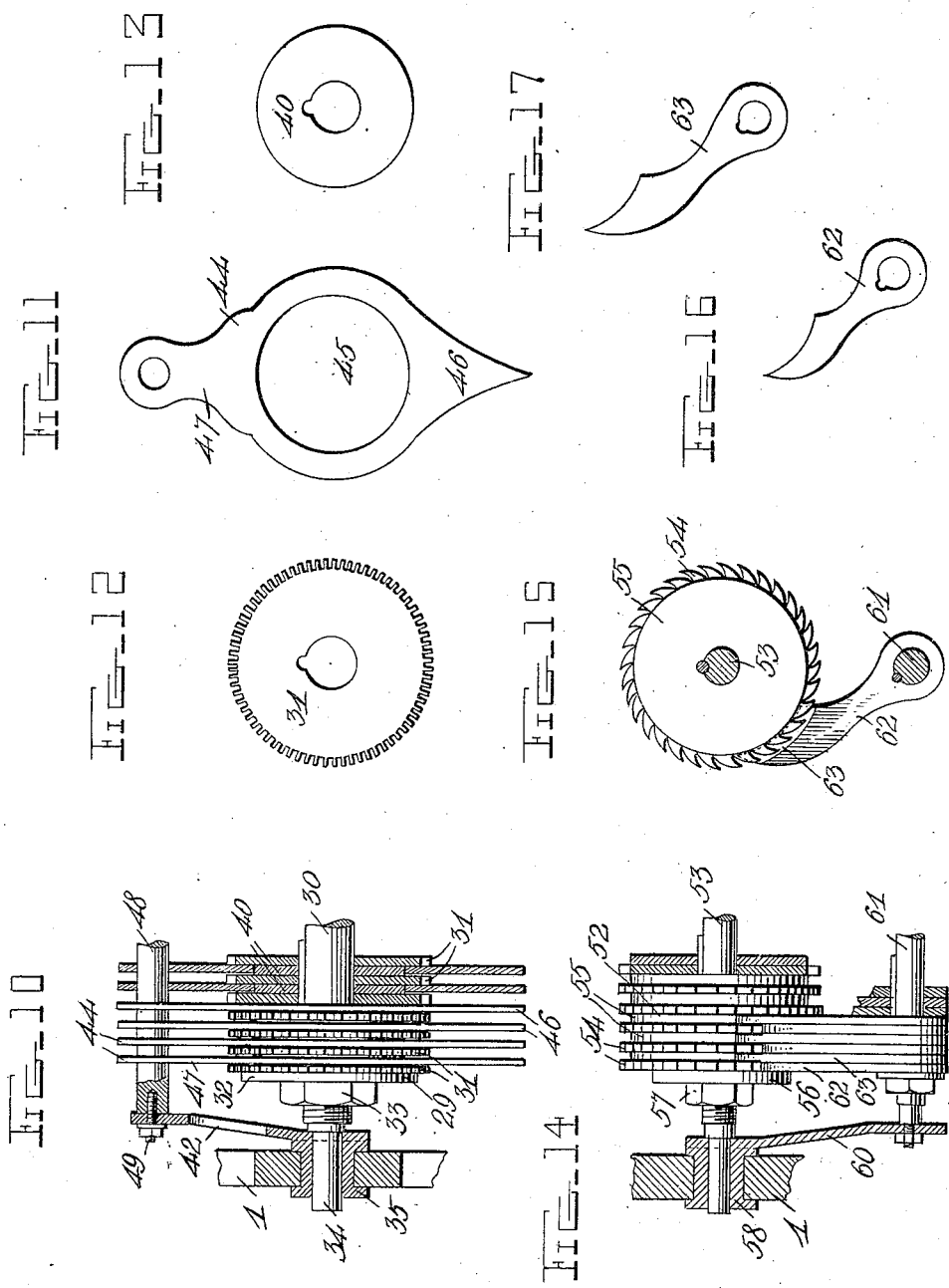

UNITED STATES PATENT OFFICE.

BASIL H. PAUL, OF FRESNO, CALIFORNIA.

MACHINE FOR SEEDING RAISINS AND OTHER FRUITS.

No. 868,290.　　　　　Specification of Letters Patent.　　　　　Patented Oct. 15, 1907.

Application filed January 3, 1907. Serial No. 350,676.

*To all whom it may concern:*

Be it known that I, BASIL H. PAUL, a citizen of the United States, residing at Fresno, in the county of Fresno and State of California, have invented certain new and useful Improvements in Machines for Seeding Raisins and other Fruits; and I do declare the following to be a full, clear, and exact description of the invention, such as will enable others skilled in the art to which it appertains to make and use the same.

This invention relates to improvements in machines for seeding raisins and other fruits, and it consists in the construction, combination and arrangement of devices hereinafter described and claimed.

One object of my invention is to combine with a pressing roller and seeding roller a feeding and preparing mechanism, which coacts with the pressing roller to flatten, press and spread the raisins and to press the seeds to one side of the raisins to facilitate their removal by the subsequent coaction of the pressing and seeding roller.

A further object is to effect improvements in the construction of the seeding roller and provide the plates or disks thereof with detachable teeth, which may be readily replaced when broken or damaged.

A further object is to effect improvements in the construction of the teeth of the seeding roller disks or plates, whereby the stripping of the seeded raisin meats from the said teeth is facilitated, and whereby efficiency of the teeth in forcing the seeds from the raisins is increased.

A further object is to combine with the seeding roller, a pressing roller which is rotated by frictional contact therewith, so that the opposing surfaces of the said rollers are caused to move uniformly at the same rate of speed and slipping or lost motion which might cause the raisins to be unnecessarily torn or damaged is avoided.

A further object is to effect improvements in the stripping means which coact with the disks or plates of the seeding roller to strip the seeded raisin meats from said roller.

A further object is to combine with the seeding roller improved means for stripping the seeds therefrom without injuring the meats of the raisins, and without wasting a portion of said meats.

A further object is to effect improvements in the construction of the rollers which strip the seeds of the seeded raisins from the seeding roller.

A further object is to provide means for supplying moisture to the feeding and preparing roller, and means for supplying moisture to the seeding and seed stripping rollers.

In the accompanying drawings,—Figure 1 is a side elevation of a raisin seeding machine, constructed in accordance with my invention; Fig. 2 is a vertical longitudinal sectional view of the same; Fig. 3 is a vertical transverse sectional view of the same, taken on the plane indicated by the line *a—a* of Fig. 1; Fig. 4 is a detail sectional view of the seeding roller; Fig. 5 is partly a detail elevation and partly a longitudinal sectional view of the same; Fig. 6 is a detail elevation of one of the stripping rings of the said roller on a reduced scale, as compared with Figs. 4 and 5; Fig. 7 is a detail sectional perspective view on an enlarged scale of a portion of one of the disks or plates of the seeding roller, also showing some of the detachable teeth thereof; Fig. 8 is a detail elevation of one of the detachable teeth; Fig. 8$^a$ is a detail outer end elevation or plan of the same; Fig. 9 is a detail transverse sectional view of the same, taken on the plane indicated by the line *b—b* of Fig. 8; Fig. 10 is partly a detail elevation and partly a longitudinal sectional view of the preparing and feeding roller and its coacting stripping plates; Fig. 11 is a detail elevation of one of the stripping plates of said roller; Fig. 12 is a similar view of one of the peripherally-toothed disks of said roller; Fig. 13 is a similar view of one of the washers of said roller; Fig. 14 is partly a detail elevation and partly a longitudinal sectional view of one of the seed stripping rollers and its coacting stripping finger plates; Fig. 15 is a transverse detail sectional view of the same; and Figs. 16 and 17 are detail elevations of said seed stripping finger plates.

The frame 1 may be of the form here shown, or of any other suitable construction. The shaft 2 of a feeding roller 3 is journaled in bearings in the sides of said frame. At one end of said shaft is a power pulley 4 for engagement by a driving belt 5, and a pulley 6 is also secured to the said shaft. The seeding roller is composed of a series of circular plates 7, having central openings through which the said shaft extends, heads 8 and nuts 9, the latter being screwed in the said shaft and serving to clamp the plates firmly together and between the said heads, and to also permit the plates to be moved apart to enable any of them to be supplied with a tooth or a plurality of teeth should the same become broken. Each plate is provided in one side, near its periphery, with an annular, concentric groove 10, whereby a shoulder 11 is formed on the inner side of said groove and an annular tongue or shoulder 12 is formed on the outer side of said groove, between the latter and the periphery. Said tongue is formed with radial seats 13, which are semi-circular in cross-section, to receive the reduced semi-cylindrical shanks 14 of teeth 15, the shoulders 16 at the ends of said shanks bearing against the inner and outer sides of said tongue or shoulder 12 to hold the teeth firmly in place and yet permit the teeth to be readily removed from any plate, by first moving the latter from the next adjacent plate and then pressing laterally against the teeth. Hence, the teeth of the plates of the seeding roller are detachable, and may be readily replaced by others at very slight expense, should any of them become broken. The shoulder 11 of each plate is provided with recesses 17 to receive the inner, pointed ends 17', of the removable teeth, said recesses and pointed ends coacting with the seats 13 and reduced shanks 14 to firmly hold the teeth in place, so that the teeth can not become casually dislodged. It will be observed by reference to Fig. 5 of the drawings that the outer sides of the teeth are flush with the grooved sides of the plates, and that the plane side of each plate bears against the grooved side of the next adjacent plate and also against the flush sides of the teeth therein, so that the teeth are also clamped between the plates and each plate serves to secure the teeth in the seats of the next adjacent plate.

The outer ends of the teeth 15 coact with a pressing roller 18 to cause the raisins to be impaled upon the said teeth and the seeds of the raisins to be removed therefrom and to be forced out upon the outer ends of the teeth. To prevent the seeds from lodging between the teeth of the plates, each tooth has its outer end beveled laterally as at 19, 20, on the front and rear sides, to provide faces which are oblique to the plane of revolution of the seeding roller. Hence, the spaces between the outer ends of the teeth of each plate are oblique to the plane of revolution thereof. The width of such spaces is also less than the least diameter of the seeds, and this in connection with the oblique faces of the teeth prevents the seeds from lodging between them, as will presently appear. Furthermore, the oblique faces of the teeth, owing to the rotary motion of the seeding roller, in coaction with the fixed stripping rings 21, greatly facilitate the stripping of the meats of the seeded raisins from the seeding roll.

It will be observed that the stripping rings are placed on the peripheries of the plates of the seeding roll, between the teeth thereof, so that the teeth of each plate, excepting the end plates, are between a pair of the stripping rings, and hence the latter keep the teeth straight and prevent them from becoming bent laterally and getting out of line. The said stripping rings have upwardly-extending arms 22, here shown as having openings 23, through which a rod 24, which connects and is adjustable in slots in the sides of the frame passes, said rod serving to securely hold the said stripping rings and prevent them from turning. The front and lower portion of each stripping ring has its outer edge 25 concentric with the seeding roller. The rear side of each stripping ring has its outer edge 26 eccentric to the seeding roller so that it extends to the periphery thereof at a point near the top of the roller, as at 27.

The pressing roller 18 has a peripheral face 28 of rubber or other suitable yielding elastic material. One side of the pressing roller bears against one side of the seeding roller. Above the latter and also bearing against the pressing roller is a feeding and preparing roller 29, which comprises a shaft 30, peripherally-toothed disks 31 splined thereon, washers 40 between the disks, and heads 32 and nuts 33 which clamp said disks and washers together. The journals 34 at the ends of said shaft bear in blocks 35, which are adjustable in inclined openings 36, in the sides of the frame. Plates 37, which are detachably secured to the sides of the frame by screws 38, close the upper ends of the said openings and serve as nuts for adjusting screws 39, which are swiveled to the said bearing blocks and serve to hold and adjust the same, and hence to also adjust the feeding and preparing roller. The said adjustable bearings have upwardly-extending arms 42, each of which has a slot 43, open at one end. Fixed stripping and feeding plates 44 have openings 45 for the reception of the washers 40, and in which the latter rotate, said plates being interposed between the disks 31. Each of said plates has a downwardly-projecting stripping and feeding arm 46, which extends between the rollers 3 and 18 and also has an upwardly-projecting arm 47, having an opening for the reception of a supporting rod 48, which is secured between and to the arms 42 of the bearings 35 by screws 49, which are adjustable in and removable from the slots in the said arms. It will be observed that the said slots are concentric with the shaft 30, so that the stripping and feeding plates may be turned as may be required to adjust their arms 46 toward or from the roller 18. Since the rod 48, to which the plates 44 are attached, is secured to the adjustable bearings 35 of the roller 31, it will be understood that said rod and the said plates are adjustable simultaneously with the said roller. On one end of the shaft 30 of said roller is a pulley 50.

Opposed to the under, front side of the seeding roller 3 is a seed stripping roller 52. The same comprises a shaft 53, peripherally hooked disks 54, washers 55, which are interposed between said disks, and heads 56 and nuts 57 which serve to clamp said disks and washers together. Said disks and washers are splined on and removable from the shaft to facilitate repairs or sharpening of the hooks on the disks. The said shaft is journaled in bearings 58, which are similar to the bearings 35 and are adjusted as may be required by screws 59. The arms 60 of said bearings 58 depend therefrom and carry a detachable rod 61. On the said rod are splined detachable simitar-shaped, alternately-disposed seed stripping finger plates 62, 63, which are respectively opposed to the peripheries of the hooked disks 54 and the washers 55. Said finger plates may be readily detached from one another and from the rod 61 as will be understood. On one end of the shaft 53 of the said seed stripping roller 52 is a pulley 64. It will be observed by reference to Fig. 2 of the drawings that the seed stripping roller 52 does not come in contact with the seeding roller, but is adjusted to a distance therefrom which is in practice slightly less than the diameter of a raisin seed.

At a suitable distance in rear of the seed stripping roller 52 is a second seed stripping roller 65, which is substantially identical in construction with said roller 52, with the exception that the peripheral hooks of its disks are turned in the reverse direction to those of the disks of the said roller 52. Said roller 65 has adjustable bearings 66, adjusting screws 67 therefor, and stripping finger plates 68, which are respectively identical with those which coact with the roller 52. Said second seed stripping roller is adjusted more closely to the seeding roller than the seed stripping roller 52, and its shaft has a pulley 69 at one end, which is larger than the pulley 64 of the roller 52.

An endless belt 70 engages and connects the pulleys 6, 50, 64 and 69 of the seeding, feeding, and seed stripping and second seed stripping roller respectively. Said belt also engages idle pulleys 71, 72 and 73, which have fixed axles, and an idle pulley 74, which has an adjustable bearing 75, which may be adjusted by means of a screw 76. Within the scope of my invention, any suitable means may be employed to drive the rollers.

The pressing roller 18, which has adjustable bearings 77, and screws or other suitable devices 78 to adjust them, is rotated solely by frictional contact of the seeding roller and the feeding roller, or either of them, therewith, and in practice said pressing roller is preferably provided with anti-friction ball bearings. The feeding and preparing roller, the seeding roller and the second seed stripping roller 65 rotate in the same direction. The seed stripping roller 52 rotates in the reverse direction, so that the opposed surfaces of the seeding roller and seed stripping roller move in the same direction. The speed of the stripping roller 52 is much greater than that of the seeding roller, so that its hooks move faster than and rearwardly past the teeth of the seeding roller. The second seed stripping roller 65, which rotates in the same direction as the seeding roller, rotates also at a much lower rate of speed.

A perforated pipe 79 is so disposed as to discharge steam or sprays of hot water against the upper side of the feeding and preparing roller 29. A similar pipe 80, which is located below the seeding roller and between the seed stripping rollers 52, 65, discharges steam or sprays of hot water against said rollers. In rear of the seeding roller is a deflecting board 81. The discharge chute of a feeder, which forms no part of this invention, is indicated at 82, above the pressing roller 18.

The operation of my improved raisin seeding machine is as follows: The raisins are delivered on the pressing roller 18 from the chute 82 and are carried by said pressing roller to the feeding and preparing roller 29, which being in contact with the pressing roller coacts therewith to press, flatten and spread the raisins before the latter reach the seeding roller. While the raisins are passing between the pressing and feeding and preparing rollers, the teeth of the disks of the feeding and preparing roller serve to press the seeds of the raisins toward the sides thereof, which are presented to the pressing roller. The rubber peripheral surface of the latter yields to such pressure. As the raisins pass from between said rollers, they are caught by the arms 46 of the plates 44 and drawn from the toothed disks of the feeding and preparing roller and held in contact with the periphery of the pressing roller, the edges of the said arms, which are opposed to the said pressing roller, being substantially concentric therewith and hence the said arms and the said pressing roller serve to cause the raisins which have been thus prepared to be carried down to the seeding roller. Inasmuch as the plates 44 are adjustable angularly with reference to the pressing roller, the arms 46 of said plates may be set at any required distance from the pressing roller, according to the size of the raisins and their condition. It will be observed by reference to Fig. 2, that while the faces of the arms 46, which are opposed to the pressing roller, are substantially concentric therewith, they are not exactly so, but recede downwardly therefrom to form passages which gradually widen downwardly between said pressing roller and said arms, which gradually widening passages greatly facilitate the feeding of the prepared raisins to the seeding roller, as will be understood. As the raisins pass between the pressing roller and the seeding roller, their meats are pressed into the spaces between the teeth of the several disks or plates of the seeding roller, become impaled on the said teeth and the latter serve to force the seeds therefrom, so that the seeds are forced to the outer ends of the teeth. The oblique disposition of the front and rear sides of the outer ends of the teeth provide the latter with cutting edges of maximum length with reference to the thickness of the teeth and facilitate the action of the teeth in causing the raisins to become impaled thereon, and the bevels on the front and rear sides of the teeth which provide such oblique faces are effective to prevent the seeds from becoming permanently lodged between the teeth. After the raisins pass from between the seeding roller and the pressing roller, they are carried by the seeding roller to the high speed roller 52, the hooks of which move in the same direction as the opposing surface of the seeding roller and at a higher rate of speed, so that they sweep rearwardly past the teeth of the seeding roller and in so doing cut the outer skins of the raisins at the points where the seeds are and said hooks engage the said seeds and strip them from the raisin meats, which remain lodged between the teeth of the several disks or plates of the seeding roller. As the seeds are carried by the hooks of the seed stripping roller 52, they come in contact with the rear faces of the stripping finger plates 62, 63, and are forced therefrom by the said finger plates. The stripping roller 52 is spaced from the seeding roller to a greater extent than the stripping roller 65, so that only the larger seeds and those which have been most prominently forced from the raisins by the coaction of the pressing and seeding rollers are taken from the raisins and from the seeding roller by the said stripping roller 52, but the skins of the raisins over such seeds as are not taken from the raisins by the roller 52, are cut over such seeds by the action of the hooks of the disks of said roller 52, and when such seeds as are not taken from the raisins by the said roller 52 reach the second seed stripping roller 65, the latter which is more closely disposed with relation to the seeding roller than the said roller 52, serves to take such seeds from the raisins, still leaving the raisin meats between the teeth of the several disks or plates of the seeding roller and on the peripheries of the rings 21. As the seeded raisin meats are carried rearwardly and upwardly by the seeding roller after passing the second seed stripping roller 65, they are gradually forced by the coaction of the eccentric rear faces 26 of the rings 21 and the motion of the seeding roller outwardly from between the teeth of the several disks or plates of the seeding roller, the oblique disposition of the front and rear faces of the outer portions of the teeth of said disks or plates greatly facilitating the dislodging of the raisin meats from said teeth and roller. As the seeded raisin meats reach the shoulder of the rings 21 at the point 27, they drop from the seeding roller onto the deflector 81, from which they pass to a suitable receiving receptacle.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

While I have shown and described my invention as a raisin seeding machine, it will be understood that by properly varying and proportioning the parts thereof, the same may be employed for seeding prunes and other fruits, and I do not desire to limit myself in this particular.

Having thus described my invention, what I claim as new and desire to secure by Letters-Patent, is,—

1. In combination with the pressing and seeding rollers of a raisin seeding machine, a feeding and preparing roller opposed to the pressing roller, having peripheral teeth to press the raisin seeds toward said pressing roller and to flatten and spread the raisins before the latter pass between the pressing and seeding rollers, and means in the path of travel of the raisins between the feeding and preparing roller and pressing and seeding rollers to draw the flattened raisins from the teeth of the former roller and direct them between the latter rollers.

2. In combination with the pressing and seeding rollers of a raisin seeding machine, a feeding and preparing roller opposed to the pressing roller, having peripheral teeth to press the raisin seeds toward said pressing roller and to flatten and spread the raisins before the latter pass between the pressing and seeding rollers, and means opposed to the pressing roller between the preparing and feeding roller and the seeding roller to form downwardly-widening passages, through which the prepared raisins are carried by the action of the pressing roller to the seeding roller.

3. In combination with the pressing and seeding rollers of a raisin seeding machine, a feeding and preparing roller opposed to the pressing roller, having peripheral teeth to press the raisin seeds toward said pressing roller and to flatten and spread the raisins before the latter pass between the pressing and seeding rollers, and means opposed to the pressing roller between the preparing and feeding roller and the seeding roller to form passages, through which the prepared raisins are carried by the action of the pressing roller to the seeding roller, said means comprising relatively-fixed plates having arms opposed to the pressing roller and extending toward the seeding roller.

4. In combination with the pressing and seeding rollers of a raisin seeding machine, a feeding and preparing roller opposed to the pressing roller having peripheral teeth to press the raisin seeds toward said pressing roller and to flatten and spread the raisins before the latter pass between the pressing and seeding rollers, and means opposed to the pressing roller between the preparing and feeding roller and the seeding roller to form passages, through which the prepared raisins are carried by the action of the pressing roller to the seeding roller, said means comprising relatively-fixed adjustable plates having arms opposed to the pressing roller and extending toward the seeding roller.

5. In combination with the pressing and seeding rollers of a raisin seeding machine, preparing and feeding means comprising a revoluble roller having spaced peripheral toothed-disks, and plates between said disks having arms opposed to the pressing roller and extending toward the seeding roller.

6. In combination with the pressing and seeding rollers of a raisin seeding machine, a preparing and feeding roller adjustable toward and from a pressing roller and comprising spaced peripherally-toothed disks, and plates disposed between the disks of the latter and having arms opposed to the pressing roller and extending toward the seeding roller.

7. In combination with the seeding roller of a raisin seeding machine and means to impale raisins on the teeth of said roller, a primarily-acting seed stripping roller opposed to and spaced from the seeding roller, and a second seed stripping roller in rear of the first-mentioned seed stripping roller and disposed more closely with relation to the seeding roller than said primarily-acting stripping roller.

8. In combination with the seeding roller of a raisin seeding machine, and means to impale raisins on the teeth thereof, a primarily-acting seed stripping roller opposed to the seeding roller, revolved in the reverse direction to that of the seeding roller, and at a higher rate of speed, and a second seed stripping roller in rear of the first-mentioned seed stripping roller opposed to the seeding roller and revolved at a lower rate of speed and in the same direction as that of the seeding roller.

9. A raisin seeding machine having a seeding roller provided with disks or plates, each having an annular groove in one side forming an annular tongue without said groove at the periphery of said disk or plate, said tongue provided with seats and detachable teeth having portions to fit in said seats.

In testimony whereof I have hereunto set my hand in presence of two subscribing witnesses.

BASIL H. PAUL.

Witnesses:
J. W. GARNER,
C. MUNKER.